United States Patent [19]
Djoko et al.

[11] Patent Number: 6,085,335
[45] Date of Patent: Jul. 4, 2000

[54] SELF ENGINEERING SYSTEM FOR USE WITH A COMMUNICATION SYSTEM AND METHOD OF OPERATION THEREFORE

[75] Inventors: Surnjani Djoko, Richardson; Hua Jiang; Hee C. Lee, both of Plano; Sairam Subramanian, Dallas; Seshagiri Madhavapeddy, Richardson; Kalyan Basu, Plano, all of Tex.

[73] Assignee: Nortel Networks Limited, Montreal, Canada

[21] Appl. No.: 09/001,282

[22] Filed: Dec. 31, 1997

Related U.S. Application Data

[60] Provisional application No. 60/061,053, Oct. 2, 1997.

[51] Int. Cl.$^7$ .................................................. G06F 11/00
[52] U.S. Cl. ................................................. 714/26; 714/48
[58] Field of Search ................................. 714/26, 33, 25, 714/31, 48; 709/223, 224

[56] References Cited

U.S. PATENT DOCUMENTS

| | | | |
|---|---|---|---|
| 5,539,877 | 7/1996 | Winokur et al. | 395/183.02 |
| 5,680,541 | 10/1997 | Kurosu et al. | 395/183.02 |
| 5,828,830 | 10/1998 | Rangarian et al. | 714/48 |
| 5,896,083 | 4/1999 | Eshghi et al. | 706/45 |
| 5,920,607 | 7/1999 | Berg | 379/1 |
| 6,012,152 | 1/2000 | Douik et al. | 714/26 |

*Primary Examiner*—Joseph E. Palys
*Assistant Examiner*—Ronald D Hartman, Jr.
*Attorney, Agent, or Firm*—Bruce Garlick; James Harrison

[57] ABSTRACT

A self engineering system includes a data acquisition module, a self engineering engine, and a control module. The data acquisition module couples to the communication system and receives current operating data of the communication system. The self engineering engine receives the current operating data and determines new operating parameters of the communication system based upon the current operating data and current operating parameters. The control module implements the new operating parameters within the communication system. The self engineering system may include an expert system that receives the current operating data and, based upon the current operating data and the current operating parameters of the communication system, produces the new operating parameters. The expert system includes a fact library, a knowledge base and an inference engine. The fact library includes configuration data, historical operating data, the current operating parameters and proposed operating parameters. The knowledge base consists of rules intended to alter the fact library based upon contents of the fact library and the current operating data. Finally, the inference engine executes the rules and alters the fact library. The knowledge base and the inference engine then work together to produce the new operating parameters based upon contents of the fact library. The expert system may also include a system simulator that simulates operation of the communication system to verify proposed operating parameters prior to their implementation. The self engineering system also determines configuration errors, possible hardware faults and even improper hardware installation of the communication system. Thus, the self engineering system is useful in cross-checking installation as well as the functionality of the communication system as installed.

32 Claims, 9 Drawing Sheets

SELF ENGINEERING SYSTEM FOR USE WITH A COMMUNICATION SYSTEM AND METHOD OF OPERATION THEREFORE

CROSS-REFERENCE TO RELATED APPLICATION

The present application claims priority pursuant to 35 U.S.C. Sec. 119(e) to U.S. Provisional Application Ser. No. 60/061,053 filed Oct. 2, 1997, co-pending, which is hereby incorporated herein by reference in its entirety.

BACKGROUND

1. Technical Field

This invention relates generally to the operation of communication systems; and more specifically to a self engineering system that operates in conjunction with a wired, wireless or other communication system to improve performance of the communication system.

2. Related Art

Both wireless and wired communication systems are generally known in the art. Wired communication systems, such as the public switched telephone network (PSTN), include a substantial infrastructure that serves wired endpoint devices such as telephones, computers and other electronic devices. Wireless communication systems, on the other hand, also include substantial infrastructure but connect to endpoint devices via a wireless interface. Examples of such wireless communication systems are the Advanced Mobile Phone System (AMPS) and the Time Division Multiple Access (TDMA) system which are generally in place across North America and the Global Standard for Mobility (GSM) system which is generally in place in Europe.

System engineering plays a crucial role in the design and operation of all communication systems. For example, in many wired communication systems, a network of digital multiplex switches (DMSs) performs call routing and processing functions to serve millions of endpoint device users. The DMSs are intercoupled by trunk lines, fiber optic cables, microwave communication links, satellites and other communication links. Selection and placement of the DMSs and the associated communication links depends on, among other things, call initiation and termination location loading, traffic levels and traffic patterns among other criteria. Sufficient infrastructure must be installed initially to serve the traffic. When initially constructed, the wired communication system is designed to provide satisfactory service by installing sufficient equipment and setting operating parameters correctly. Then, as the usage of the communication system increases, additional resources must be allocated, installed and operated to serve the additional customers.

Likewise, in the engineering of wireless communication systems, infrastructure sufficient to support an initial customer base must first be installed. Careful planning of radio frequency (RF) propagation, traffic patterns and mobility management within a geographic service area is first undertaken. Then, based upon the results, mobile telephone exchanges (MTXs) or mobile switching centers (MSCs), base switching centers (BSCs) and base transceiver stations (BTSs) are located and installed within the geographic service area. The installed hardware provides the infrastructure that will support the wireless coverage within the service area.

After installation, operating parameters for the equipment must be chosen and implemented. The current practice of wireless network engineering relies heavily on operating theory and simulation modeling. Expensive simulation models model call traffic levels and patterns, RF propagation, subscriber mobility and equipment performance. Engineers, working with the models, as well as with field measurements, attempt to derive optimal operating parameters. Once derived, the operating parameters are used to program operation of the hardware forming the wireless infrastructure. If the predictions as to RF propagation and mobility management are accurate, adequate wireless coverage will be provided within the coverage area.

However, assumptions made regarding customer and system behavior not always accurately represent the system or only accurately represent the system for a short period of time. Overall, the simulation models make assumptions that are often idealized and thus provide operating parameters that are not be optimal for any specific system. Moreover, the call traffic, RF conditions, subscriber mobility conditions and the offered service constantly change. Consequently engineers must continuously monitor the changes and derive new optimal operating parameters to achieve maximum efficiency. Because systems are oftentimes continually under modification, such continuous monitoring, simulation and tuning is virtually impossible to accomplish and quite expensive.

Users of poorly engineered communication systems experience poor call quality of service. In wired communication systems, a user may not receive a dial tone in an off-hook position, may not be able to complete a call or may have the call dropped, for example. Further, in wireless communication systems, high call drop rates, high blocked call rates and missed terminations result from poor system design and/or operation. Thus, users of poorly engineered communication systems are directly affected. Resultantly, many users of the communication system may migrate to other service providers in an attempt to obtain higher quality service.

Not only do users of poorly engineered communication systems suffer, the operator of the poorly engineered system suffers as well. Because the capacity of a poorly engineered communication systems is less than that of a properly engineered communication system, the system operator is able to service fewer customers. With fewer customers serviced, revenues obtained by the system operator are less, harming the operator's business. Moreover, with service quality at a lesser level, the system operator must expend greater resources in interfacing with the customer, in advertising to obtain replacement customers for those that have left and ultimately, reduce the charged cost for providing the poor service.

Assumptions made with respect to RF propagation also change over time, sometimes very rapidly. For example, when new buildings are installed within a service area, the RF propagation changes for a portion of the communication. Flooding also affects RF propagation within the communication system. These variations cannot be planned for when initially engineering the communication system and may rapidly alter the capabilities of a communication system. Further, contingency situations such as those caused by tornadoes that destroy system components cannot be adequately planned for when initially engineering the communication system.

Thus, there is a need in the art for a system that automates the engineering required to obtain optimal performance of a communication system and that compensates for changing system conditions.

SUMMARY OF THE INVENTION

Thus, in order to overcome the shortcomings of prior systems and operations, a self engineering system constructed according to the present invention includes a data acquisition module, a self engineering engine, and a control module. The data acquisition module couples to the communication system and receives current operating data of the communication system. The self engineering engine couples to the data acquisition module and receives the current operating data from the data acquisition module. The self engineering engine then determines new operating parameters of the communication system based upon the current operating data and current operating parameters of the communication system. The control module couples to the self engineering engine and the communication system and interacts with the communication system to implement the new operating parameters within the communication system.

In a described embodiment, the self engineering includes an expert system that receives the current operating data and, based upon the current operating data and the current operating parameters of the communication system, produces the new operating parameters. In the embodiment, the self engineering system includes a fact library, a knowledge base and an inference engine. The fact library includes configuration data, historical operating data, the current operating parameters and proposed operating parameters. The knowledge base has many rules regarding parameter assignments under different possible system conditions. The rules are intended to alter the fact library based upon contents of the fact library and the current operating data. Finally, the inference engine decides which rules are satisfied by the facts, executes and alters the fact library based upon the rules from the knowledge base. After execution, the engine outputs a set of new operating parameters for the communication system.

The expert system may also include a system simulator that receives the proposed operating parameters and, based upon the proposed operating parameters and other information, simulates operation of the communication system to produce simulated results to the expert system. The expert system then uses the simulated results in determining the new operating parameters. In evaluating the simulated results, the expert system may compare operation of the communication system indicated by the simulated results to operating criteria including the current operating data. Thus, prior to implementing the new operating parameters, the self engineering engine uses the simulator to verify that the new operating parameters will improve operation of the communication system.

The self engineering system performs functions in addition to determining new operating parameters. For example, the self engineering system may also determine configuration errors of the communication system, possible hardware faults and even improper hardware installation of the communication system. Thus, the self engineering system is useful in cross-checking the installation as well as the functionality of the communication system.

In providing self engineering functions, the self engineering system may include many self engineering modules, each of which operates on a portion of the communication system. In operating on a portion of the communication system, each self engineering module operates on a subset of all system parameters that may be altered by the self engineering system. The self engineering system thus includes a overseeing collaborating process that oversees operation of the self engineering modules to ensure that the operation of each of the self engineering modules in consistent with the overall goals of the system operation. In overseeing operation, the overseeing collaborating process directs the self engineering modules to reach particular goals for respective portions of the communication system so that the particular goals contribute to attaining overall system goals.

The self engineering system may be applied to any type of communication system. When applied to a wireless communication system, the self engineering system may produce new operating parameters that affect hand-off behavior between at least two cells of a plurality of cells within the wireless communication. However, the self engineering system may also produce new operating parameters that affect routing of communications through mobile telephone exchanges, through transceiver stations or through other elements within the communication system. In the wireless communication system, the new operating parameters may be chosen to decrease the cost of routing calls, to increase the quality of calls routed within the communication system or to increase capacity of the communication system.

In another described application, the self engineering system operates to improve operation of a wired communication system. In the application, the new operating parameters may be chosen to alter routing of communications, to increase capacity of the wired communication system or to otherwise alter the manner in which calls are routed or processed within the wired communication system.

A method of self engineering a communication system according to the present invention includes interacting with the communication system using a data acquisition interface to determine current operating data of the communication system. The method also includes determining current operating parameters of the communication system. Further, the method includes determining new operating parameters of the communication system based upon the current operating data and the current operating parameters of the communication system. Finally, the method includes interacting with the communication system using a control interface to implement the new operating parameters within the communication system.

In determining new operating parameters of the communication system, the method may include using an expert system. The expert system, based upon the current operating data and the current operating parameters of the communication system, produces the new operating parameters. The expert system may further consider configuration data, historical operating data, the current operating parameters and proposed operating parameters.

In determining the new operating parameters, the method may include determining proposed operating parameters of the communication system based upon the current operating data and the current operating parameters of the communication system. Once determined, the proposed operating parameters are verified and the new operating parameters are determined based upon the proposed operating parameters and results of verifying the proposed operating parameters. Such verifying may include simulating operation of the communication system based upon the proposed operating parameters to provide simulated results to the expert system.

The method according to the present invention may include determining configuration errors of the communication system and determining possible hardware faults and improper hardware installation of the communication system among other functions. Further, as with the self engineering system, the method may be applied to any type of communication system, including wired communication systems, wireless communication systems and satellite communication systems, among others.

Moreover, other aspects of the present invention will become apparent with further reference to the drawings and specification which follow.

DETAILED DESCRIPTION OF THE DRAWINGS

Figure 1:
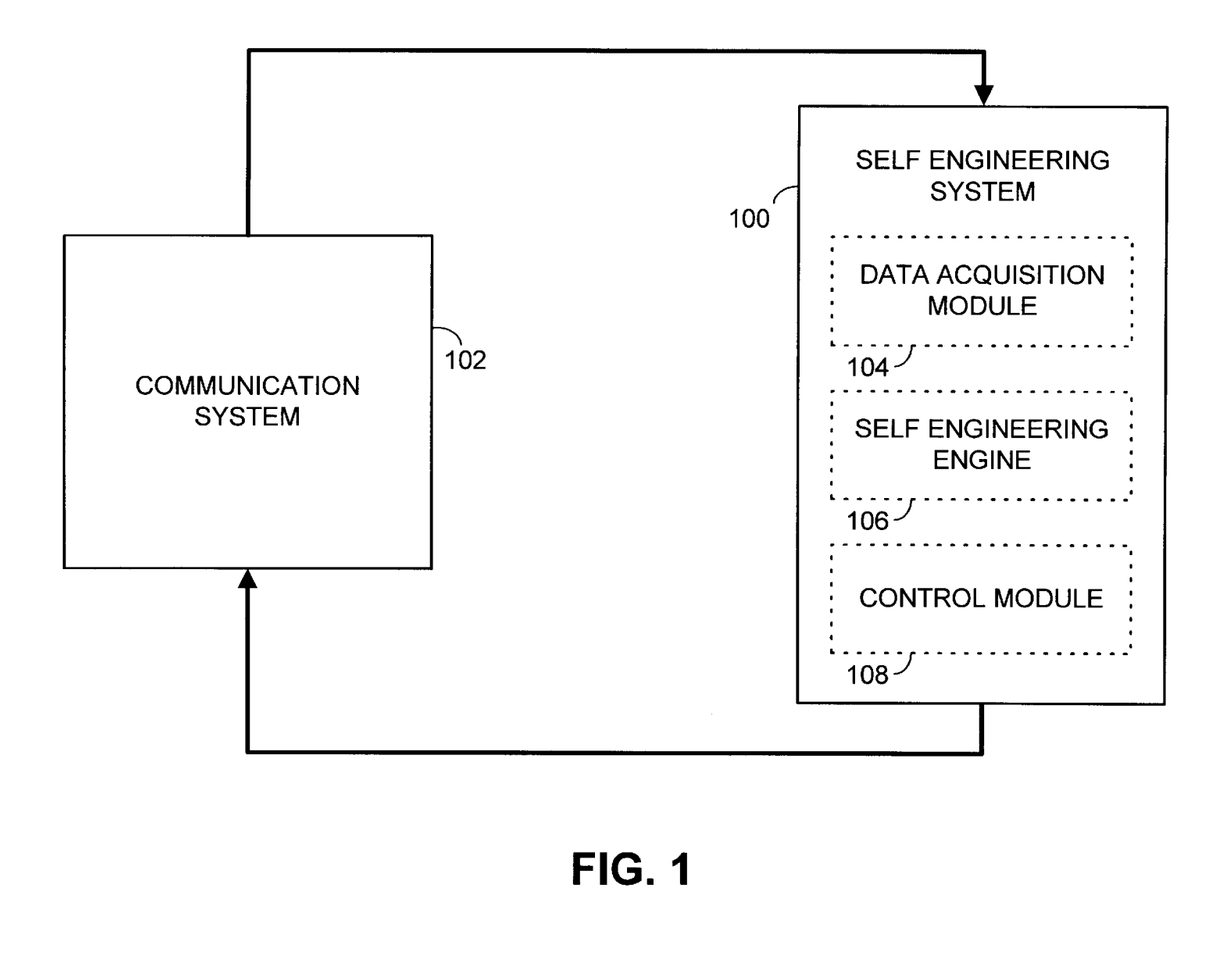
FIG. 1 is a block diagram illustrating a self engineering system constructed according to the present invention that interacts with a communication system to modify operation of the communication system to improve performance.

FIG. 1 illustrates a self engineering system 100 constructed according to the present invention and interfaced with a communication system 102. The self engineering system 100 comprises a data acquisition module 104, a self engineering engine 106 and a control module 108. The self engineering system 100 may be integrated with the wireless network system or may be implemented on an off-board platform that is directly linked to the wireless network system 102. In its operation, the self engineering system 100 interacts with the communication system 102 to alter operating parameters of the communication system 102 so as to improve and enhance performance of the communication system 102.

The data acquisition module 104 couples to the communication system 102 and receives current operating data of the communication system 102. The current operating data includes operational measurements, system logs and system parameters that are collected from locations throughout the communication system. Thus, the data acquisition module interfaces with the communication system 102 to collect information from the communication system 102 that is pertinent to adjusting operation of the communication system 102. As will be described more fully hereinafter, the data acquisition module 104 may be dispersed throughout the communication system 102 SO that it interacts directly with various components of the communication system 102 or may be centrally located, interacting with the communication system 102 via other methods.

The self engineering engine 106 couples to the data acquisition module and receives the current operating data from the data acquisition module 104. Based upon the current operating data and current operating parameters of the communication system 102, the self engineering engine 106 determines new operating parameters of the communication system to improve and enhance operation of the communication system 102.

The control module 108 couples to the self engineering engine 106 and to the communication system 102. The control module 108 interacts with the communication system 102 to implement the new operating parameters within the communication system 102. Thus, as will be more fully described hereinafter, the control module 108 may also be dispersed throughout the communication system 102 so that it interacts directly with various components of the communication system 102 or may be centrally located, interacting with the communication system 102 via other methods.

Functions of the self engineering system 100 include audit, parameter adjustment and diagnosis, among other functions. In performing audit functions, the self engineering system 100 analyzes system configuration data and detects configuration errors. Based upon the detected errors, the self engineering system 100 may either automatically correct the configuration errors via the control module 108 or, alternatively, report the configuration errors to a system operator if the self engineering system 100 is unable to automatically correct the errors. In adjusting operating parameters, the self engineering system 100 analyzes operational measurements against pre-defined system performance metrics and adjusts operating parameters to achieve optimal network performance. Finally, in diagnosing communication system 102 operation, the self engineering system 100 detects possible hardware faults and improper hardware installation. After diagnosing such hardware faults and installation errors of the communication system 102, the self engineering system 100 reports the hardware faults and installation errors to the system operator.

The self engineering engine consists of two units, a core unit and optional unit. The core unit is implemented by expert system or neural network depending on the application of self engineering system. The optional unit is a simulator. The simulator simulates various functions of the wireless network. A role of the simulator is to aid fast system parameter adjustment process. The control module provides a mechanism that receives a set of recommend parameter values from the self engineering engine and inputs them to a wireless network system in a proper format.

In monitoring system conditions and engineering the communication system 102, the self engineering system 100 compensates for various changes in communication system operating conditions. For example, a slow and gradual change in system conditions may be related to increased numbers of users of the communication system 102. However, other changes in operation may relate to sudden changes in the system, such as flooding which affects RF propagation in a wireless system and outages to communication system components that may be caused by weather. In its operation, the self engineering system 100 distinguishes between sudden changes in the communication system 102 and gradual changes in the communication system 102. Such changes are reported and the communication system 102 is reengineered to account for the changes.

In the case of sudden changes, the self engineering system 100 may assist system operators in determining an optimum way in which to compensate for the sudden change. Further, in the case of gradual changes in the communication system 102, the self engineering system 100 assists the system operator in planning expansions of the communication system 102. Thus, the self engineering system 100 operates to both compensate for contingency operation as well as to assist in system planning.

Figure 2:
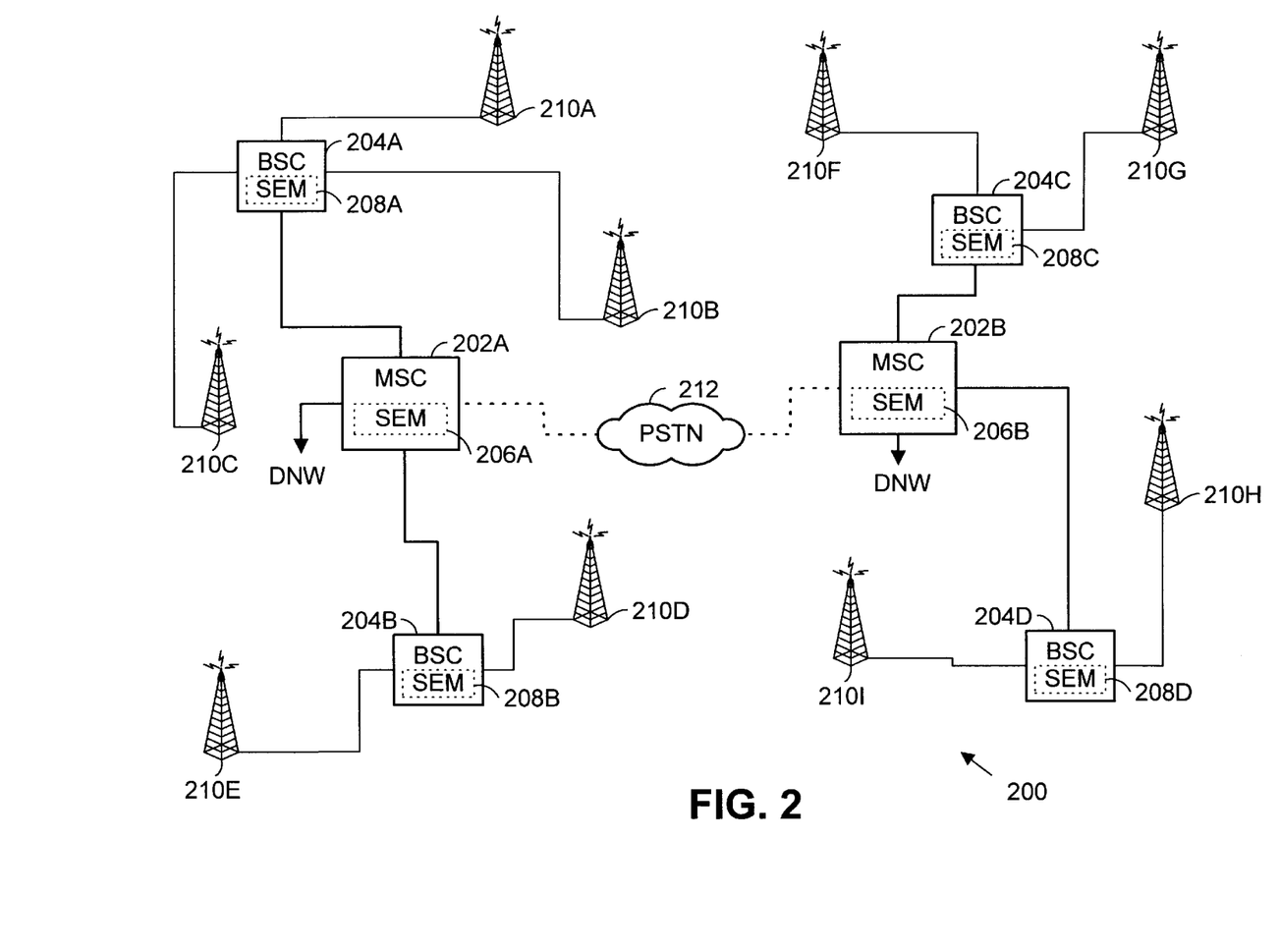
FIG. 2 is a diagram illustrating a wireless communication system in which a self engineering system constructed according to the present invention is deployed.

FIG. 2 illustrates the deployment of a self engineering system constructed according to the present invention within a wireless communication system 200. As shown, the wireless communication system 200 comprises an infrastructure that provides wireless coverage within a geographic service area. The infrastructure includes mobile switching centers (MSCs) 202A and 202B, base station controllers (BSCs) 204A, 204B, 204C and 204D and base transceiver stations (BTSs) 210A–210H. As shown, MSC 202A serves BSCs 204A and 204B. Further, BSC 204A serves BTSs 210A, 210B and 210C while BSC 204B serves BTSs 210D and 210E. As is also shown, MSC 202B serves BSCs 204C and 204D. Finally, BSC 204C serves BTSs 210F and 210G while BSC 204D serves BTSs 210I and 210H. The MSCs 202A and 202B are coupled to the public switched telephone network (PSTN) 212 and are also coupled to a dedicated network (DNW) over which control signals and traffic may be routed.

Components of the self engineering system may be dispersed throughout the wireless communication system 200 as illustrated. For example, self engineering modules 206A and 206B are located within MSCs 202A and 202B, respectively. Further, self engineering modules 208A, 208B, 208C and 208D are located within BTSs 204A, 204B, 204C and 204D, respectively. Depending upon the particular construction of the self engineering system, these modules each provide a portion of the functions of the self engineering system. In the illustrated embodiment, the self engineering engine is dispersed throughout the wireless communication system 200.

The self engineering modules 206A–206B and 208A–208D comprise units that form portions of the data acquisition module and control module, performing functions respective to the component of the wireless communication system within which they locate. The modules thus function to collect operating data from, and adjust operating parameters of the particular wireless communication system components within which they locate. The modules may comprise actual hardware elements, constructed particularly to implement the self engineering system. However, the modules may also comprise software elements, or a combination of both hardware and software elements located within the particular wireless communication system component.

In another embodiment, the self engineering system resides fully within one of the MSCs 202A or 202B, within a central office of the service provider or within other facilities. In the embodiment, the self engineering system interacts with the components of the wireless communication system via the DNW or via other communication path. When located apart from the wireless communication system, the self engineering system relies upon other available mechanisms to collect current operating data and other data required in its operation. However, the cost of deployment of such a centrally located self engineering system would be lesser than that of a deployment that required a plurality of dispersed modules.

Associated with each BTS 210A–210H is at least one cell within which wireless communications are supported. Each cell may include a plurality of sectors within which communications are supported. The BTSs 210A–210H are dispersed throughout the geographic service area to provide wireless coverage throughout the area. Adjacent cells overlap with one another across the geographic service area so that, for many portions of the geographic service area, a roaming mobile unit could communicate with more than one BTS. As mobile units roam throughout the service area while servicing an ongoing call, the ongoing call is handed off from one BTS to an adjacent BTS. Operation during such handoffs, and an example of how operation of the self engineering system optimizes system behavior to accomplish such handoffs will be discussed further herein with reference to FIGS. 7, 8 and 9.

In its operation within the wireless communication system 200, the self engineering system can be applied in call processing, network/radio resource management, system administration, and system maintenance of both wireless and wired network system components. In managing such system wide resources and activities, the self engineering system causes the wireless communication system to operate more efficiently, provide better call quality and increase system capacity.

By causing the wireless communication system 200 to operate more efficiently, the effective cost of routing calls is reduced. By increasing system capacity, a fixed set of hardware resources may service a greater number of customers without additional resource investment. Further, by managing the wireless communication system 200 to increase call quality, reduce dropped calls and to reduce the frequency of no-carrier operations, the self engineering system causes customers to be more fully satisfied with the service provided by the wireless communication system 200. With the superior service, the service provider will attract greater numbers of customers. These factors thus allow the system operator to operate the wireless communication system more profitably.

In one particular implementation, an overseeing collaborating process of the self engineering system resides within MSC 202A. The overseeing collaborating process coordinates operation of the self engineering modules 206A–206B and 208A–208D. In overseeing operation, the overseeing collaborating process establishes goals for each system component engineered by the self engineering modules 206A–206B and 208A–208D based upon overriding system goals. Each of the self engineering modules 206A–206B and 208A–208D operates upon a set of parameters respective to the components engineered. Thus, the engineering performed by the self engineering modules 206A–206B and 208A–208D is localized to respective system components. To meet system goals, each system component must meet its own goals. The overseeing collaborating process sets the individual goals and interacts with the self engineering modules 206A–206B and 208A–208D to ensure that the system goals are met. Further, the overseeing collaborating process also operates upon system parameters to adjust such parameters.

Figure 3:
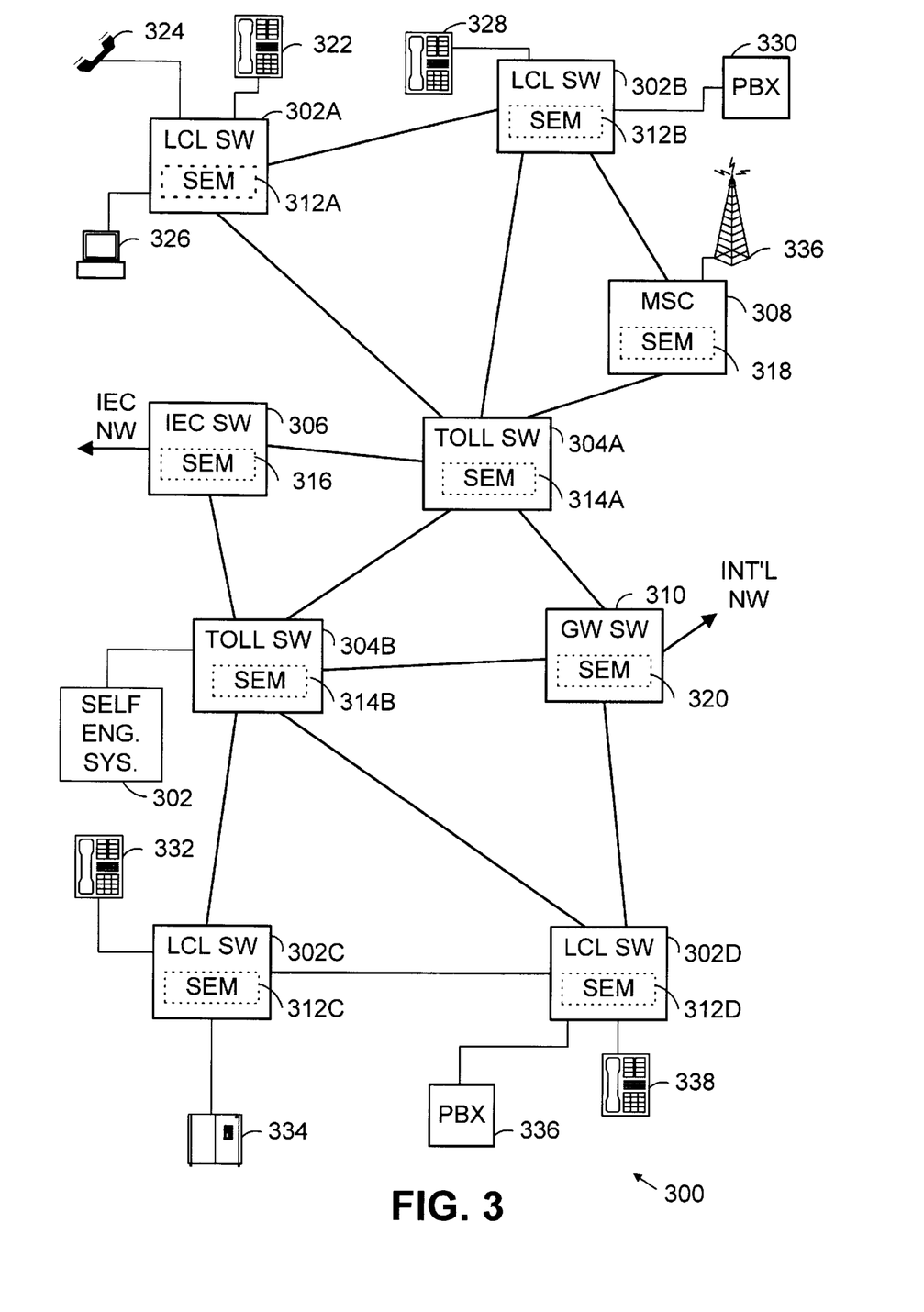
FIG. 3 is a diagram illustrating a wired communication system in which a self engineering system constructed according to the present invention is deployed.

FIG. 3 illustrates the deployment of a self engineering system constructed according to the present invention within a wired communication system 300. The wired communication system 300 includes local switches 302A, 302B, 302C and 302D, toll switches 304A and 304B, Interexchange Carrier (IEC) switch 306, MSC 308 and a Gateway switch 320. The switches of the wired communication system 300 are interconnected via interoffice trunk lines, microwave communications, fiber optic connections, satellite communications and other communication links. The switches route calls via appropriate communication links to provide services to the endpoint devices.

Local switches 302A–302D provide wired service to wired endpoint devices. For example local switch 302A provides wired service to telephones 322 and computer 326 while local switch 302B provides wired service to telephone 328 and private branch exchange (PBX) 330. Further, local switch 302C provides wired service to telephone 332 and computer 334 while local switch 302D provides wired service to PBX 336 and telephone 338. While limited numbers of endpoint devices are shown, in a typical installation, each local switch 302A–302D would serve thousands of endpoint devices. Local switches 302A–302D may also serve switch remotes which are often deployed in rural areas, new developments or office buildings and concentrate subscriber lines and provide some local switching functions, much like a PBX.

The toll switches 304A and 304B interconnect other switches and provide long-distance functions such as billing and operator services. The IEC switch 306 connects the wired network to other wired networks operated by another carrier. The Gateway switch 310 connects to wired communication system 300 to other world zones and countries which have different telephone numbering plans, signal protocols and other operating constraints. Finally, the MSC 308 provides an interface to a wireless communication system, having BTS 336, for example. Thus, the wireless communication system 200 of FIG. 2 may interconnect to the wired communication system 300 of FIG. 3.

Components of the self engineering system may be dispersed throughout the wired communication system 300 as illustrated. For example, self engineering modules 312A and 312B are located within local switches 302A and 302B, respectively. Further, self engineering modules 312C and 312D are located within local switches 302C and 302D, respectively. Likewise, self engineering modules 314A and 314B locate within toll switches 304A and 304B, respectively. Finally, self engineering modules 316, 318 and 320 locate within IEC switch 306, MSC 308 and Gateway switch 310, respectively. As with the wireless communication system 200, the modules each provide a portion of the functions of the self engineering system. Self engineering system central unit 302 couples to toll switch 304B and interconnects with the self engineering modules via the wired communication system 300, itself.

The self engineering modules 312A–312D, 314A–314B, 316, 318 and 320 also comprise units that form portions of the data acquisition module and control module, performing functions respective to the component of the wired communication system within which they locate. The modules thus function to collect operating data from, and adjust operating parameters of the particular switch or component within which they locate. The modules may comprise actual hardware elements, constructed particularly to implement the self engineering system. However, the modules may also comprise software elements, or a combination of both hardware and software elements located within the particular wired communication system component.

In another embodiment, the self engineering system resides fully within a single location, designated as the self engineering system 302 and located within a central office of the service provider or within other facilities. In the embodiment, the self engineering system interacts with the components of the wired communication system via the wired network and uses the signaling and control capabilities within the wired network to perform its functions. When located apart from the wired communication system, the self engineering system relies upon other available mechanisms to collect current operating data and other data required in its operation as it did with the wireless communication system 200. However, the cost of deployment of such a centrally located self engineering system would be lesser than that of a deployment that required a plurality of dispersed modules as with the wireless communication system.

Figure 4:
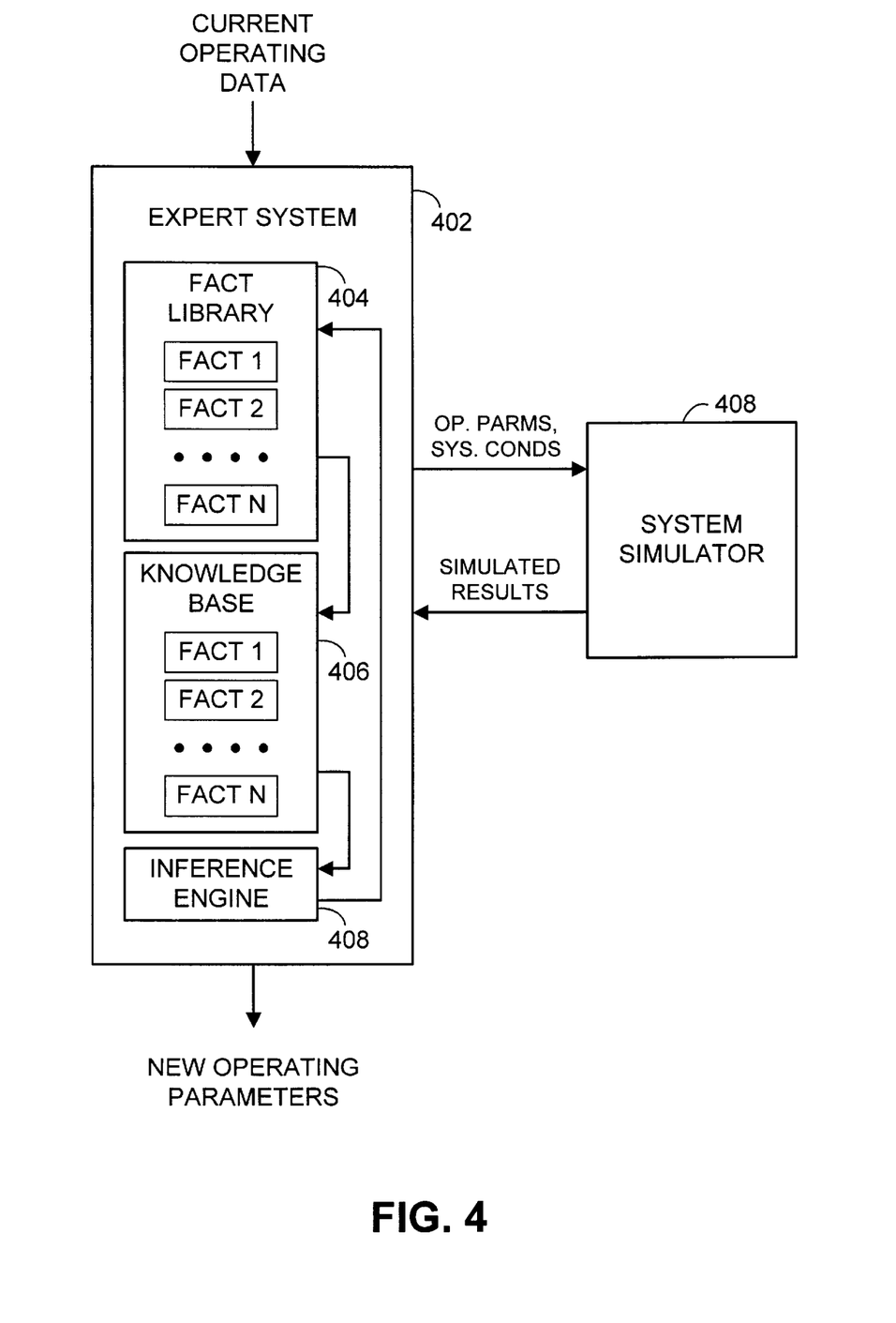
FIG. 4 is a block diagram illustrating an expert system and an optional simulator that form a portion of the self engineering system.

FIG. 4 illustrates a particular construction of the self engineering engine previously described as reference numeral 106 in FIG. 1. The self engineering engine comprises an expert system 402 that receives the current operating data as input and may include a system simulator 408. The self engineering engine, based upon the current operating data and the current operating parameters of the communication system, produces the new operating parameters.

Generally, the knowledge contained in the expert system 402 is extracted from human experts in the domain and it attempts to emulate their methodology and performance. The knowledge used by the expert system 402 is often not found in documents but comes from the experience, rules of thumb and judgement of humans working in the domain. In the wireless network, the parameter optimizations are currently done by the experienced engineers. There are enormous numbers of parameters to be optimized, and it is not feasible to optimize each of them manually. Hence, the self engineering system built with expert system 402 can automate the optimization process.

The expert system 402 includes a fact library 404, a knowledge base 406 and an inference engine 408. The fact library 404 includes configuration data that has been previously input by a system operator or acquired from prior operations. The configuration data represents the construction of the communication system. The fact library 404 also includes historical operating data which provides a base line in evaluating the current operating data. Additionally, the fact library 404 includes the current operating parameters and proposed operating parameters. The facts contained in the fact library 404 are shown as facts FACT 1 through FACT N. In a typical implementation, the fact library will store thousands of facts which represent the communication system at any particular time.

The knowledge base 406 comprises rules in the expert system 404 that are represented as condition-action pair in which the condition is the conjunction of several facts that produce an output. The inference engine 408 receives output from the knowledge base 406 and alters the fact library based upon the output. Such alteration may include the addition of a new fact to the fact library, the deletion of a fact from the fact library or the modification of a fact in the fact library. The inference engine 408 also interprets output received from the fact library 404 and the knowledge base 406 to produce the new operating parameters. The inference engine 408 not only operates to determine proposed operating parameters but also determines configuration errors, possible hardware faults and improper hardware installation of the communication system.

During operation of the expert system 402, the inference engine 408 produces proposed operating parameters and places the proposed operating parameters in the fact library 404. Should the system simulator 408 be present, the proposed operating parameters may be evaluated by the system simulator 408 prior to their being deemed the new operating parameters. The system simulator 408 produces simulator based on a most accurate assessment of the system condition at the time of operation. Thus, with proper operating parameters and system conditions passed to the system simulator 408 an accurate evaluation as to improved or degraded behavior using the proposed operating parameters is determined. Should operation be improved at a sufficient level, the proposed operating parameters may then be deemed the new operating parameters.

Figure 5:
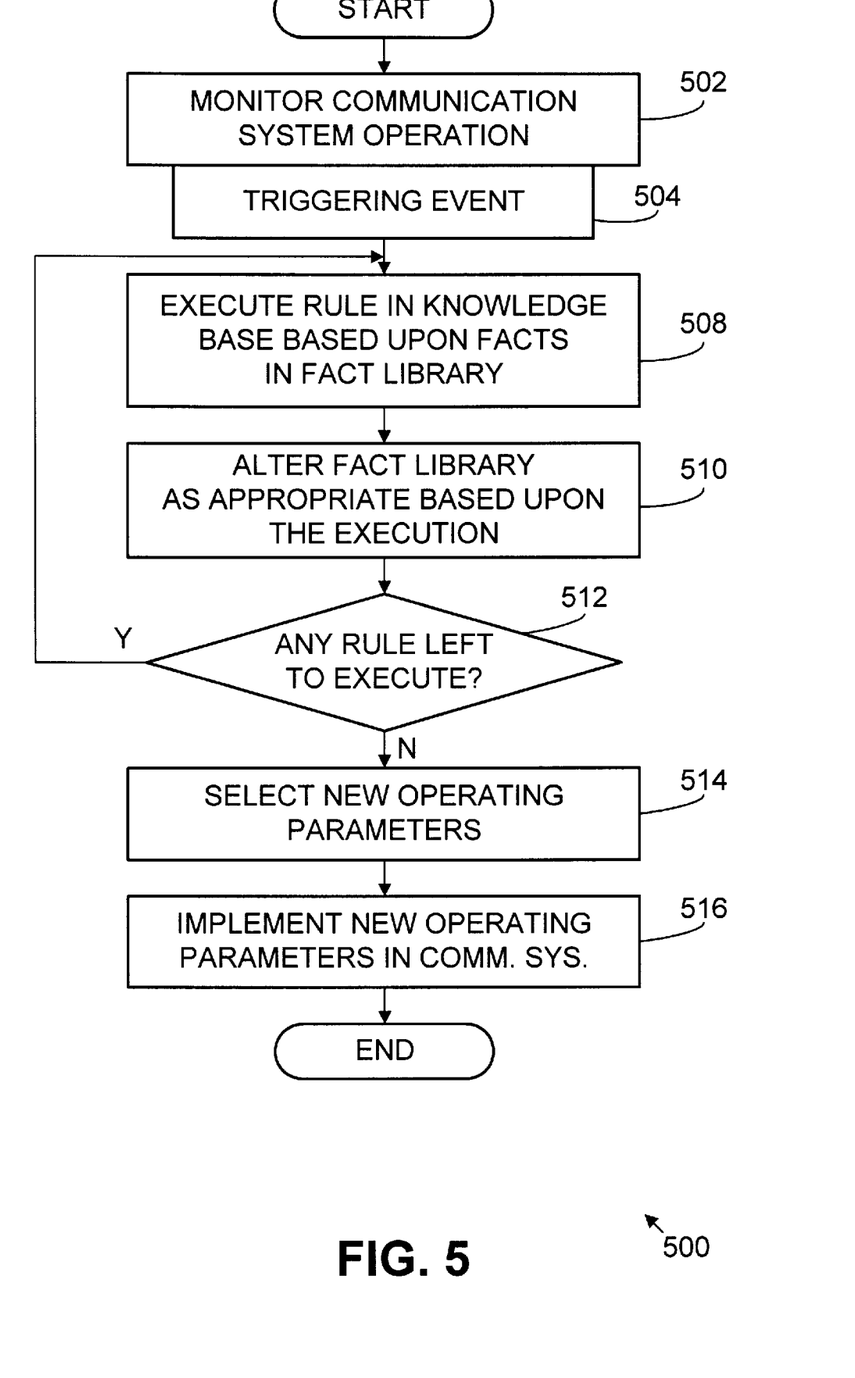
FIG. 5 is a logic diagram illustrating an overview of operation of the self engineering system in modifying operation of a communication system.

FIG. 5 illustrates operation 500 of a self engineering system constructed according to the present invention. Operation commences at step 502 wherein the self engineering system monitors operation of the communication awaiting a triggering event. During monitoring the communication system, the data acquisition module continually acquires current operating data. The triggering event may be intervention by a system operator or may be met when operation of the communication system fails to reach a predetermined level of operation. In determining when the triggering event is met, the data acquisition module and/or self engineering engine may continually evaluate the current operating data.

When the triggering event is met at step 504, operation proceeds to step 508 wherein the inference engine executes a rule in the knowledge base 406 based upon facts in the fact library. Then, at step 510, the inference engine 408 modifies the fact library 404 based upon the execution. Should any rule be left to be executed at step 512, operation proceeds again to step 508. However, if no rules are left for execution at step 512, new operating parameters are selected by the inference engine 408 at step 514. Then, at step 516, the control module 108 implements the new operating parameters in the communication system.

Figure 6:
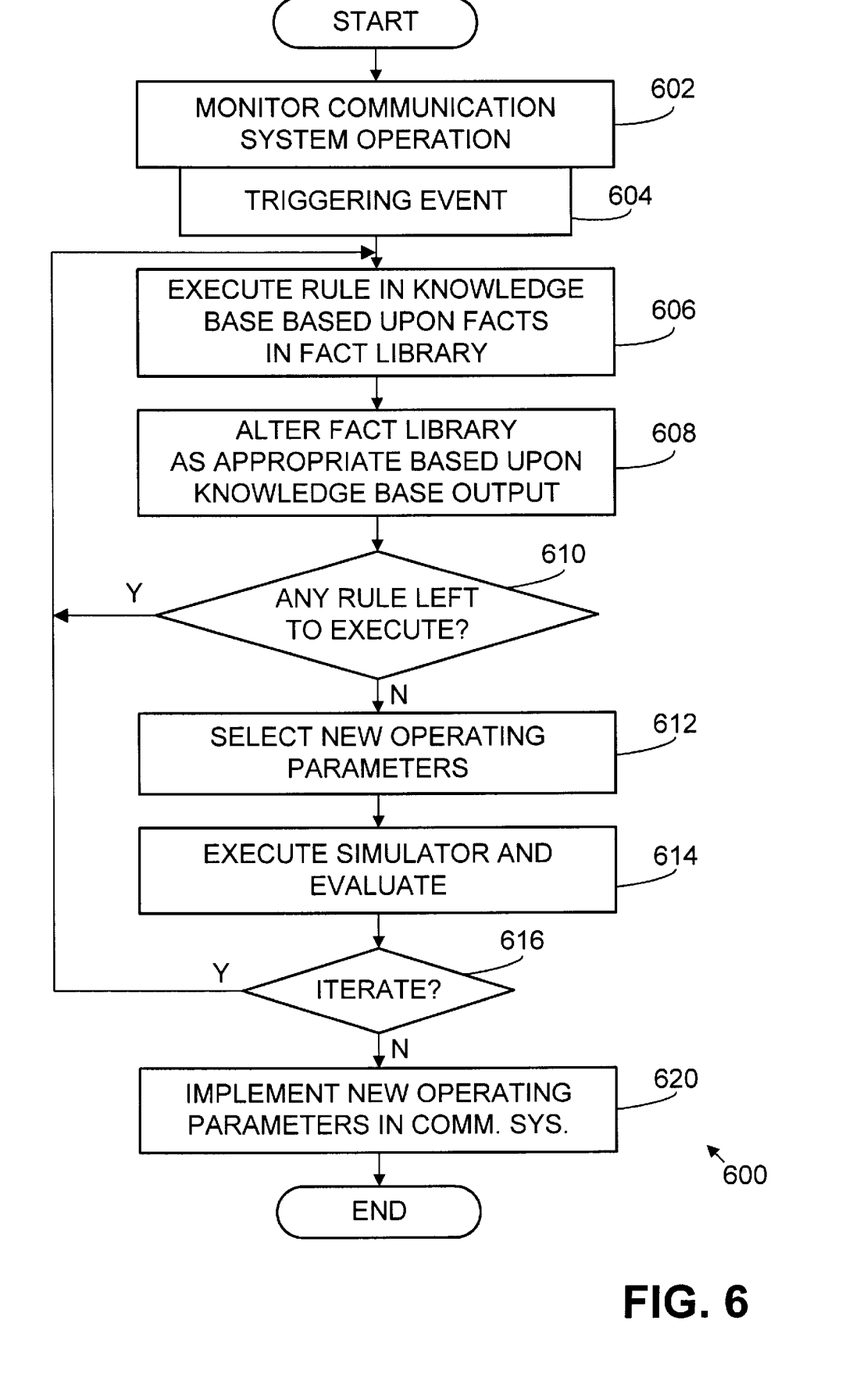
FIG. 6 is a logic diagram illustrating alternate operation of the self engineering system in modifying operation of a communication system, such alternate operation including simulating operation of the communication system prior to selecting new operating parameters.

FIG. 6 illustrates operation 600 of a self engineering system constructed according to the present invention but including a communication system simulator. Operation commences at step 602 wherein the self engineering system monitors operation of the communication awaiting a triggering event. When the triggering event is met at step 604, operation proceeds to step 606 wherein the inference engine 408 executes rules in the knowledge base 406 and modifies the fact library 404 based upon the execution at step 608.

If there is any rule left to be executed at step 610, operation proceeds to step 606. Otherwise, operation proceeds to step 612 where new operating parameters are selected. Then, the communication system simulator 408 is executed to evaluate the proposed operation parameters at step 614. After execution, the self engineering engine evaluates the simulated results and decides whether iteration is required at step 616. Should iteration be required, operation proceeds to step 606. However, if iteration is not required at step 616, operation proceeds to step 620 where the control module 108 implements the new operating parameters in the communication system.

The operations 500 and 600 described with reference to FIGS. 5 and 6, respectively, may be accomplished for each of the self engineering modules 206A–206B and 208A–208D described with reference to FIG. 2. Further, the operations 500 and 600 may also be accomplished with respect to the overseeing collaborating process previously described to achieve overall system engineering. Thus, the steps described with respect to the operations 500 and 600 may be executed for many portions of the communication system separately and also as a whole for the communication system.

Figure 7:
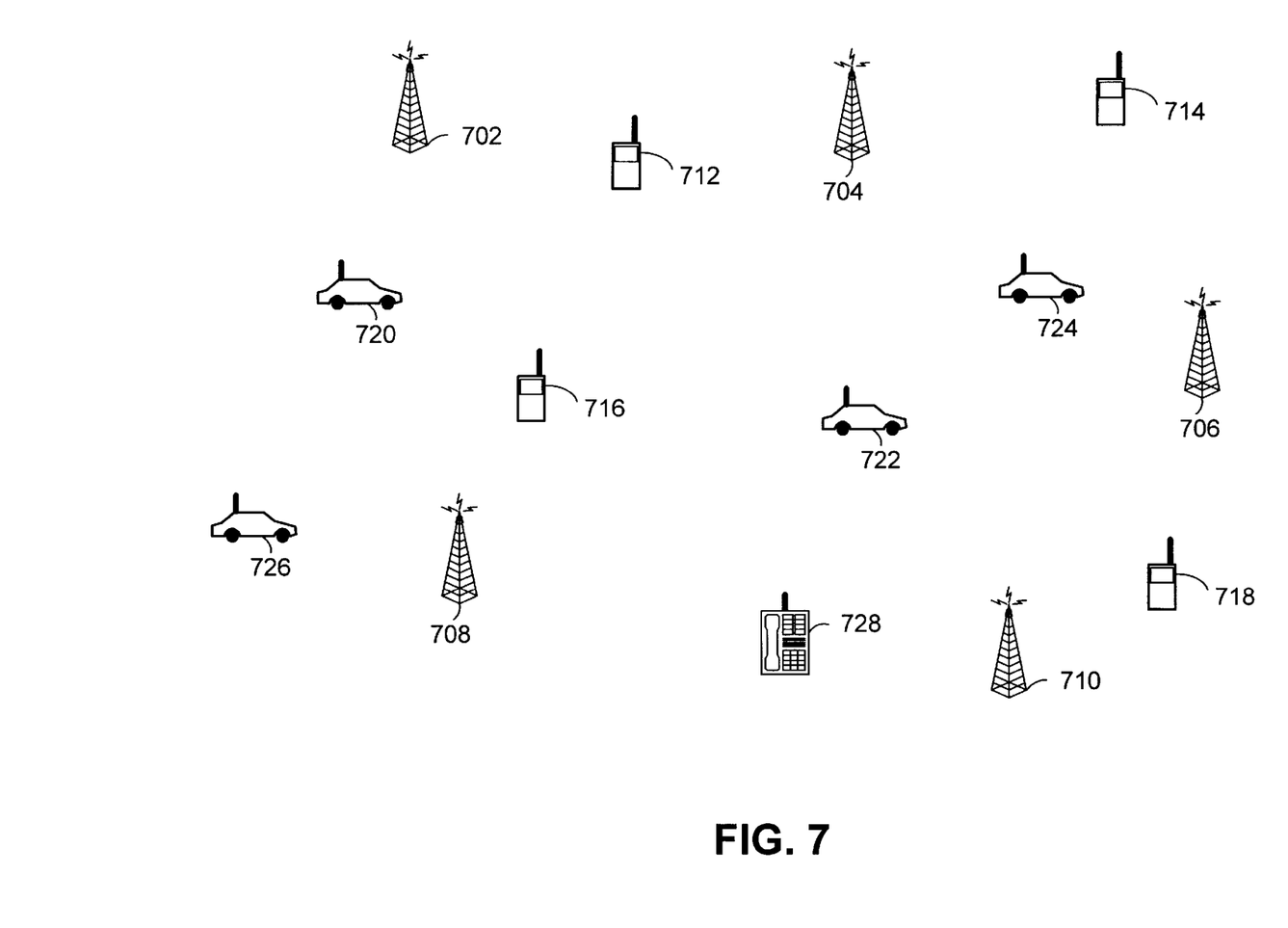
FIG. 7 is a diagram illustrating a wireless communication system that provides wireless coverage within a geographic service area and that may be acted upon by the self engineering system.
Figure 8:
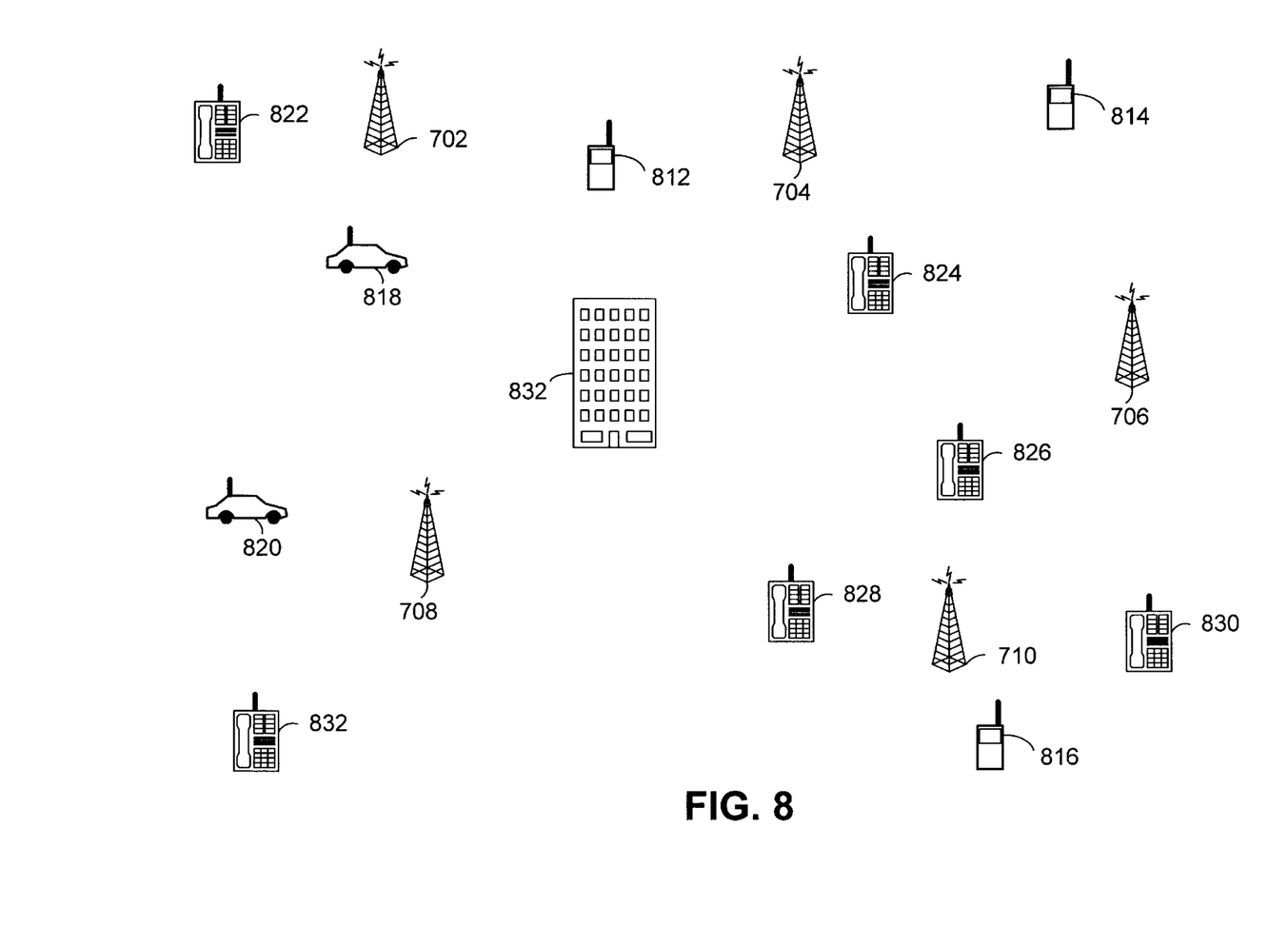
FIG. 8 is a diagram illustrating the wireless communication system of FIG. 7 but after customer load patterns and RF propagation properties within the geographic service area have changed over time.
Figure 9:
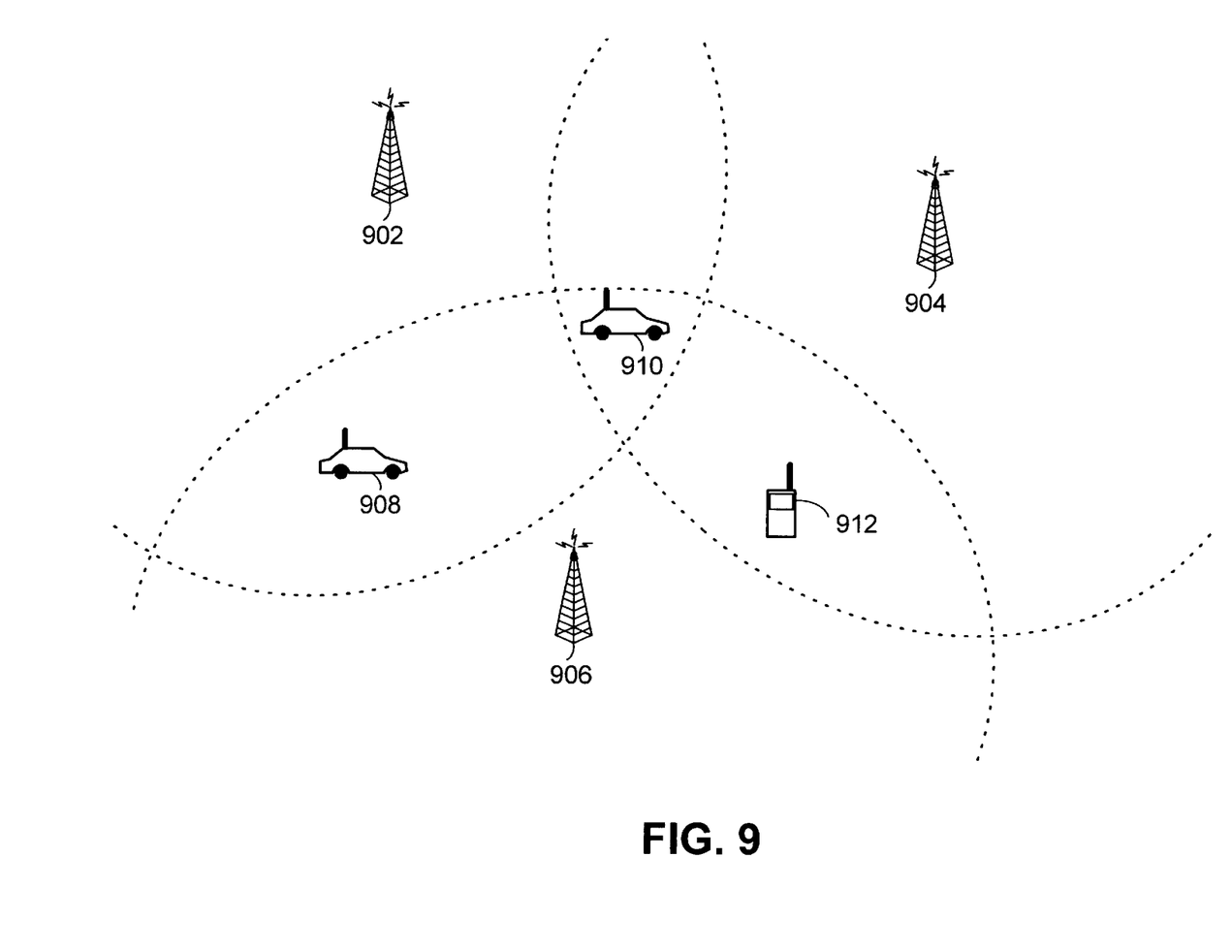
FIG. 9 is a diagram illustrating the hand-off of communications among communication cells serviced by the wireless communication system of FIG. 8.

FIGS. 7, 8 and 9 are used to illustrate use of the self engineering system of the present invention in altering operating parameters relating to hand-off in a portion of a wireless communication system. FIG. 7 illustrates construction of a wireless communication system soon after installation. As shown, BTSs 702, 704, 706, 708 and 710 provide wireless coverage within a portion of a service area. Hand-held mobile units 712, 714, 716 and 718 as well as automobile installed mobile units 720, 722, 724 and 726 are served by the wireless communication system satisfactorily after installation.

However, as shown in FIG. 8, after the wireless communication system has been installed for some time, the geographic area served changes as does the load served by the system. The system now serves wireless local loop (WLL) customers 822, 824, 826, 828, 830 and 832. Further, the system still serves mobile units 812, 814, 816, 818 and 820. Additionally, a building 832 has been installed within the area served, altering RF propagation within the service area. Because both the mobility and number of units being served has changed as has the RF propagation within the area served by the wireless communication system, operating parameters that previously provided satisfactory performance no longer do so. One particular set of parameters that needs to be altered as the wireless communication system changes relate to handoff.

Handoff is a process whereby a mobile unit, served by a particular BTS radio, is transferred to another radio. The transfer is triggered by a mechanism which is related to received signal level, call quality, or system loading. Handoffs may be intra-partition, inter-partition, or inter-system. Handoff may also be inter-mode in each of the cases. During handoff, the level of a received signal is measured. Then, when a trigger level relating to the received signal is met a handoff is requested by the mobile unit. The wireless communication system then selects eligible candidate partitions for handoff. A best candidate partition is then established and then the handoff is completed. The objectives of handoff are to minimize network congestion, unnecessary handoff requests, source usage, interference, dropped calls, handoff delay, and maintain operator defined cell boundaries.

FIG. 9 illustrates typical handoff scenarios. BTSs 902, 904 and 906 each provide wireless coverage within respective cells outlined by the dotted arcs which overlap one another in some portions of the coverage area. When a mobile unit is within multiple cells, as is shown for each mobile unit 908, 910 and 912, the mobile unit could communicate with any BTS providing wireless coverage in the area. For example, mobile unit 908 could communicate with BTS 902 or 906, mobile unit 912 could communicate with BTS 904 or 906 and mobile unit 910 could communicate with BTS 902, 904 or 906. Handoff operations attempt to have the mobile units communicate with the most favorable BTS at the time.

Relative signal strength indication (RSSI) handoff is a basic handoff type in the wireless network system. A mobile unit is considered to be better served by an adjacent cell if the RSSI measured on the adjacent cell is stronger than the RSSI measured on the current serving cell. The parameters involved in RSSI handoff are handoff threshold values, handoff target cell threshold values, hysteresis and number of handoff retry value, for example. Such parameters may include RSSI, GSAMP, HORETRY, HOTL, PCPTL, PCPHYST, SERVHYST, PARMHYST, SERVBIAS, and PCPBIAS. The metrics used to adjust the parameters are call/cell dragging, number of handoff request messages, voice channel usage, handoff retry ratio, handoff cancellation and call drop ratio.

RSSI handover is triggered when the adjacent sector RSSI exceeds the serving sector RSSI by a user defined threshold value. Since the radio unit is able to identify the target sector, screening and sorting is not required, and the handover is executed immediately. The parameters involved in RSSI handover are LEFTDELT, RGHTDELT, and REARDELT which are RSSI threshold values between a serving sector and its neighboring sectors. Sector dragging metric is used to adjust the RSSI handover parameters.

Bit error rate (BER) handoff is an interference-based handoff type that can trigger a handoff in order to provide a clearer channel for a mobile unit. Low level interference can degrade the quality of speech of an active call; high level interference can cause a call to drop. The parameters involved in BER handoff are BERLONG, BERSHORT, BERNOISE, BERDROP, NSTHRESH, CIDELTA, DPCTL and DPCTH. The metrics used are drop call ratio, BER handoff completion ratio, and BER inter handoff trigger ratio. These metrics are used to adjust the BER parameters.

Handoff parameter optimization is performed by experienced engineers and does not lend itself to easy automation. Thus, the expert system 402, simulator 408 and interface to the wireless operational measurements and logs from the wireless communication system allow handoff to be optimized and simulated by the self engineering system. The expert system 402 has many rules regarding parameter assignments under different handoff types and plausible conditions. The expert system 402 initially obtains the knowledge or rules of parameter optimization from human experts. These rules are utilized to set initial values for different parameters. As the conditions in the field change, the system will automatically change the relevant parameter values based on the field data, and iteratively evaluate their merits using the simulator. Once a stable assignment has been achieved the results are implemented in the wireless communication system and set in place for reevaluations by the self engineering system. The effects on the field are observed and used to calibrate both the simulator and the rules in the expert system.

Facts in the self engineering system are represented as objects that have an attribute value structure. The element of this structure is an attribute name and the value of the attribute. The facts consist of the parameters per cell (i.e., HOTL, RSSISAMP), the parameter per cell pair (i.e, PCPTL, PCPHYST), the operational measurements and logs collected from a field (i.e., number of handoff completion for a cell site), the threshold setting acquired from engineers (i.e., handoff delta), the cell site adjacency, the partial conclusions (i.e., the intermediate conclusion derived from rules), and final conclusions (i.e., the suggested value adjustment for parameter settings).

For example, a cell site with a set of its parameters is represented as (parameter-per-cell (cell 4x) (radius 0.731 miles) (confg 120-deg-stsr) (hotl −55 dB) (rssisamp 10) (parmhyst 3 dB) (servhyst 2 dB) (servbias 0 dB) (horetry 11) (leftdelt 4 dB) (rghtdelt 4 dB) (reardelt disabled) (cishort disabled) (cilong disabled) (bershort 2) (berlong 5) (cinoise disabled) (cidrop disabled) (bernoise 4), (berdrop 5) (nsthresh −96 dB) (cidelta disabled) (noise-floor −110 dB))

Rules in the self engineering system are represented as condition-action pair in which the condition is the conjunction of several facts and the action could be either addition of a new fact to the fact library or deletion of a fact from the fact library, or modify a fact in the fact library. The knowledge base consists of rules that controls the execution of overall handoff parameter optimization. Audit rules consists of rules to audit the network adjacency table, unidirectional handoffs and handoff completion imbalance. Call dragging reduction rules consists of rules to adjust parameters (i.e., HOTL, REARDELT) such that call dragging can be minimized or eliminated. Interference reduction rules consist of rules to adjust parameters (i.e., BERNOISE, STHRESH) such that excessive dropped calls can be minimized. Handoff messaging reduction rules consists of rules to adjust parameters (i.e., PCPTL) such that extraneous handoff measurement activity can be minimized.

In an English version of an example rule, if the average candidate RSSI minus the serving RSSI for a cell pair is greater than 9 dB then the cell pair is considered to be call dragging. The above rule can be represented in CLIPS as the following:

```
(defrule check-call-dragging
  (declare (salience 4000))
  (avg-metric-per-cell-pair (name avgsrvrssi) (from-cell
      ?fc) (to-cell ?tc) (value ?v1))
  (avg-metric-per-cell-pair (name avgcanrssi) (from-cell
      ?fc) (to-cell ?tc) (value ?v2))
  (test ◊ ?v2 0.0))
  (parameter-per-cell (cell ?fc) (radius ?) (confg ?) (hotl ?)
  (rssisamp ?) (parmhyst ?) (servhyst ?) (servbias ?) (horetry
  ?) (leftdelt ?) (rghtdelt ?) (reardelt ?) (cishort ?) (cilong ?)
  (bershort ?) (berlong ?) (cinoise ?) (cidrop ?) (bernoise ?)
  (berdrop ?) (noise-floor ?n)) (threshold-int (name handoff-
  delta) (value ?th1))
  =>
  (if (>(−?v2?v1)?th1) then
      (assert (metric-checked-per-cell-pair (name call-
          dragging) (category high) handoff-delta ?hdelta)
          (noise-delta ?) (from-cell ?fc) (to-cell?tc)))
  )
)
```

The portion of the simulator relating to handoff is written in SIMSCRIPT language. The simulator creates RF and traffic environment as close to the actual field as possible, and simulates the RSSI handoff, RSSI handover, and BER handoff process. Hence, the impact of the parameters changes can be measured.

The initial setting of parameters relating to handoff are set by actual field parameter values. The distribution of mobile unit's direction is based on the actual field operational measurement data. The mobile unit speed and direction may change in time, and its location is updated every unit time. The RSSI and C/I of each mobile unit are also updated every unit time. The interference is calculated from all active co-channels and adj-channels. Inputs to the simulator include antenna data such as pattern, down tilt, height, gain and ERP, RF condition such as propagation model (urban, suburban and rural), cell site locations, signal and interference such as forward and reverse link, handoff and power control parameters, cell adjacency, ERP and speed ranges for different type of mobile units and mobile unit distribution, traffic per cell, handoff traffic between each cell pair.

The simulator performs functions which include statistical behavior of thousand of mobile units, RF performance of a system (hundreds of cells), long term and short term RSSI and C/I measurements, movement of subscribers, fast and slow power control (FDPC, SDPC), channel and radio resources management, simulation of RSSI, and BER handoff and handover and RSSI and C/I call drop checking. Output produced by the simulator include operational measurements, call blocking rate, call drop rate, handoff success rate, handoff drop rate, power control trigger angle rate and distribution of BER and RSSI. Thus, once the simulator has run, the expert system 402 may evaluate the results obtained and determine whether to implement the respective proposed operating parameters.

Adopting the self engineering approach to handoff parameter optimization is a very effective long term solution for wireless network. The approach has the following benefits. First, it increases the capacity and performance of wireless networks. It also greatly reduces the engineering cost by requiring field visits by trained engineers only during very extreme situations. Otherwise, routine optimization is automatically performed by the self engineering system. Further, implementing such a system as part of the wireless product will reduce the engineering complexity of the network by orders of magnitude.

While the illustrated example focused on handoff parameter optimization, the self engineering system of the present invention applies to all parameters that affect operation of the communication system. Further, the self engineering system applies equally as well to sudden system communication system changes cased by outages, flooding and other events that suddenly affect the manner or characteristics of the communication system. During these conditions, the self engineering system operates to adjust operation of the communication system as soon as the condition occurs.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A self engineering system that operates to improve performance of a communication system, the self engineering system comprising:
    a data acquisition module coupled to the communication system that receives current operating data of the communication system;
    a self engineering engine coupled to the data acquisition module that receives the current operating data from the data acquisition module and that determines new operating parameters of the communication system based upon the current operating data and current operating parameters of the communication system, the self engineering engine comprising an expert system including:
        a fact library that includes configuration data, historical operating data, the current operating parameters and proposed operating parameters;
        a knowledge base that includes rules that alter the fact library based upon contents of the fact library and the current operating data; and
        an inference engine coupled to the knowledge base that executes rules in the knowledge base and alters the fact library, the expert system using the fact library to produce the new operating parameters; and
    a control module coupled to the self engineering engine and the communication system that interacts with the communication system to implement the new operating parameters within the communication system.

2. The self engineering system of claim 1, wherein the expert system further comprises:
    a system simulator that receives the proposed operating parameters and that simulates operation of the communication system to produce simulated results to the expert system; and
    the expert system producing the new operating parameters based upon the proposed operating parameters and the simulated results.

3. The self engineering system of claim 1, wherein the expert system further determines configuration errors of the communication system.

4. The self engineering system of claim 1, wherein the expert system further detects possible hardware faults and improper hardware installation of the communication system.

5. The self engineering system of claim 1, wherein the communication system provides wireless coverage within a service area.

6. The self engineering system of claim 5, wherein:
    the wireless coverage is provided within a plurality of cells forming the service area; and
    the operating parameters affect hand-off behavior between at least two cells of the plurality of cells.

7. The self engineering system of claim 5, wherein:
    the communication system comprises at least two mobile telephone exchanges; and
    the operating parameters affect the routing of communications through the at least two mobile telephone exchanges.

8. The self engineering system of claim 5, wherein:
    the communication system comprises a plurality of base transceiver stations; and
    the operating parameters affect the routing of communications through the plurality of base transceiver stations.

9. The self engineering system of claim 5, wherein the new operating parameters are chosen to decrease the cost of routing calls within the communication system.

10. The self engineering system of claim 5, wherein the new operating parameters are chosen to increase the quality of calls routed within the communication system.

11. The self engineering system of claim 5, wherein the new operating parameters are chosen to increase capacity of the communication system.

12. The self engineering system of claim 1, wherein the communication system includes a plurality of switches interconnected by communication lines.

13. The self engineering system of claim 12, wherein the new operating parameters are chosen to alter routing of communications within the communication system.

14. The self engineering system of claim 12, wherein the new operating parameters are chosen to increase capacity of the communication system.

15. The self engineering system of claim 1, wherein the self engineering system includes a plurality of self engineering modules, each of the plurality of self engineering modules engineering a portion of the communication system.

16. The self engineering system of claim 15, further comprising an overseeing collaborating process that manages the plurality of self engineering modules.

17. A method of self engineering a communication system, the method comprising:
    interacting with the communication system using a data acquisition interface to determine current operating data of the communication system;
    determining current operating parameters of the communication system;
    determining new operating parameters of the communication system based upon the current operating data and the current operating parameters of the communication system by:
        executing a plurality of rules in a knowledge base using a plurality of facts contained in a fact library to produce a knowledge base output, the plurality of facts and the plurality of rules in the knowledge base relating to the construction and operation of the communication system;

altering at least some of the plurality of facts based upon the knowledge base output; and selecting the new operating parameters based upon the plurality of facts contained in the fact library; and interacting with the communication system using a control interface to implement the new operating parameters within the communication system.

18. The method of claim 17, wherein in determining the new operating parameters, the expert system further considers configuration data, historical operating data, the current operating parameters and proposed operating parameters.

19. The method of claim 17, wherein determining the new operating parameters includes:

determining proposed operating parameters of the communication system based upon the current operating data and the current operating parameters of the communication system;

verifying the proposed operating parameters; and determining the new operating parameters based upon the proposed operating parameters and results of verifying the proposed operating parameters.

20. The method of claim 19, wherein:

verifying the proposed operating parameters includes simulating operation of the communication system based upon the proposed operating parameters to provide simulated results to the expert system; and determining the new operating parameters includes basing the new operating parameters upon the simulated results.

21. The method of claim 17, further comprising determining configuration errors of the communication system.

22. The method of claim 17, further comprising determining possible hardware faults and improper hardware installation of the communication system.

23. The method of claim 17, wherein the communication system provides wireless coverage within a service area.

24. The method of claim 23, wherein:

the wireless coverage is provided within a plurality of cells forming the service area; and the operating parameters affect hand-off behavior between at least two cells of the plurality of cells.

25. The method of claim 23, wherein:

the communication system comprises at least two mobile telephone exchanges; and the operating parameters affect the routing of communications through the at least two mobile telephone exchanges.

26. The method of claim 23, wherein:

the communication system comprises a plurality of base transceiver stations; and the new operating parameters affect the routing of communications through the plurality of base transceiver stations.

27. The method of claim 23, wherein the new operating parameters are chosen to decrease the cost of routing calls within the communication system.

28. The method of claim 23, wherein the new operating parameters are chosen to increase the quality of calls routed within the communication system.

29. The method of claim 23, wherein the new operating parameters are chosen to increase capacity of the communication system.

30. The method of claim 17, wherein the communication system includes a plurality of switches interconnected by communication lines.

31. The method of claim 30, wherein the new operating parameters are chosen to alter routing of communications within the communication system.

32. The method of claim 30, wherein the new operating parameters are chosen to increase capacity of the communication system.

* * * * *